United States Patent
Tiew et al.

(10) Patent No.: US 10,542,220 B2
(45) Date of Patent: Jan. 21, 2020

(54) IMAGE SENSOR DEVICE AND METHOD CAPABLE OF DETECTING ACTUAL TEMPERATURE RANGE IN WHICH THE IMAGE SENSOR DEVICE IS BEING OPERATED WITHOUT USING ACCURATE TEMPERATURE SENSOR

(71) Applicant: PixArt Imaging Inc., Hsin-Chu (TW)

(72) Inventors: Kei Tee Tiew, Penang (MY); Shan Chong Tan, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 71 days.

(21) Appl. No.: 15/890,364

(22) Filed: Feb. 7, 2018

(65) Prior Publication Data

US 2019/0246026 A1  Aug. 8, 2019

(51) Int. Cl.
| | |
|---|---|
| H04N 5/33 | (2006.01) |
| H04N 5/235 | (2006.01) |
| G06K 9/62 | (2006.01) |
| H04N 5/369 | (2011.01) |
| H04N 5/225 | (2006.01) |
| G01K 3/00 | (2006.01) |
| G01K 13/00 | (2006.01) |
| H04N 5/378 | (2011.01) |
| H04N 17/00 | (2006.01) |

(52) U.S. Cl.
CPC .......... *H04N 5/2353* (2013.01); *G01K 3/005* (2013.01); *G01K 13/00* (2013.01); *G06K 9/6212* (2013.01); *H04N 5/2256* (2013.01); *H04N 5/3698* (2013.01); *H04N 5/378* (2013.01); *H04N 17/002* (2013.01)

(58) Field of Classification Search
CPC ...... A61B 5/0008; H04N 5/361; H04N 5/335; H01L 27/14609
See application file for complete search history.

(56) References Cited

U.S. PATENT DOCUMENTS

| | | | |
|---|---|---|---|
| 7,140,766 B2 * | 11/2006 | Glukhovsky | ............ A61B 1/04 374/175 |
| 2004/0099920 A1 * | 5/2004 | Rossi | ..................... H04N 5/361 257/448 |

\* cited by examiner

*Primary Examiner* — Sath V Perungavoor
*Assistant Examiner* — Peet Dhillon
(74) *Attorney, Agent, or Firm* — Winston Hsu

(57) ABSTRACT

A method of an image sensor device includes: using a pixel array of the image sensor device to sense and generate at least one dark image; computing pixel statistics according to the at least one dark image; and, determining which one of a plurality of temperature ranges a temperature of the image sensor device falls within according to the pixel statistics.

16 Claims, 3 Drawing Sheets

IMAGE SENSOR DEVICE AND METHOD CAPABLE OF DETECTING ACTUAL TEMPERATURE RANGE IN WHICH THE IMAGE SENSOR DEVICE IS BEING OPERATED WITHOUT USING ACCURATE TEMPERATURE SENSOR

BACKGROUND OF THE INVENTION

1. Field of the Invention

The invention relates to an image sensor mechanism, and more particularly to an image sensor device and a corresponding method.

2. Description of the Prior Art

Generally speaking, a conventional image sensor is usually only suitable for a normal temperature range. The conventional image sensor is not suitable for a wider temperature range comprising extremely low temperature and extremely high temperature. For example, the conventional image sensor is usually configured with default current settings for LED current and/or other biasing currents for corresponding circuits. However, this inevitably introduces significant signal/image noises if the conventional image sensor operated at the wider temperature range is still configured with such default current settings. A conventional method may further adopt or employ a temperature sensor to detect the accurate value of actual temperature. However, this inevitably increases more circuit costs.

SUMMARY OF THE INVENTION

Therefore one of the objectives of the invention is to provide a novel image sensor device and a corresponding method, to solve the above-mentioned problems.

According to embodiments of the invention, a method of an image sensor device is disclosed. The method comprises: using a pixel array of the image sensor device to sense and generate at least one dark image; computing pixel statistics according to the at least one dark image; and, determining which one of a plurality of temperature ranges a temperature of the image sensor device falls within according to the pixel statistics.

According to the embodiments, an image sensor device is disclosed. The image sensor device comprises a pixel array and a processing circuit. The pixel array is configured to sense and generate at least one dark image. The processing circuit is coupled to the pixel array and configured for computing a pixel statistics according to the at least one dark image, and determining which one of a plurality of temperature ranges a temperature of the image sensor device falls within according to the pixel statistics.

According to the embodiments, it is not required/necessary to further employ a temperature sensor to detect and obtain an accurate value of the currently actual temperature, and the circuit costs can be reduced. In addition, the image sensor device is capable of optimizing its performance by dynamically adjust LED current and/or biasing current(s) of other circuits based on appropriate settings corresponding to different temperature ranges, so as to avoid image/signal noises and to save circuit costs. Also, the image sensor device is more suitable for a wider temperature range such as from −40° C. to 125° C.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a process/method applied into an image sensor device and capable of detecting which one of multiple temperature ranges the temperature (e.g. working/operating environment temperature) of the image sensor device falls within without using a temperature sensor. The rough temperature detection provided by the process/method is achieved by detecting dark image(s)/frame(s) to generate/obtain pixel statistics and then comparing the generated/obtained pixel statistics with pixel reference(s) to decide which one of multiple temperature ranges the currently actual temperature falls within or to classify the currently actual temperature into one of the multiple temperature ranges, to generate a comparison result. After detecting/deciding such temperature range, the process/method is to control and/or adjust at least one current associated with the image sensor device based on such detected temperature range indicated by the comparison result and a corresponding setting among various different settings, to avoid signal noise and/or to save more power. Since it is not required/necessary to further employ a temperature sensor to detect and obtain an accurate value of the currently actual temperature, the circuit costs can be reduced.

Figure 1:
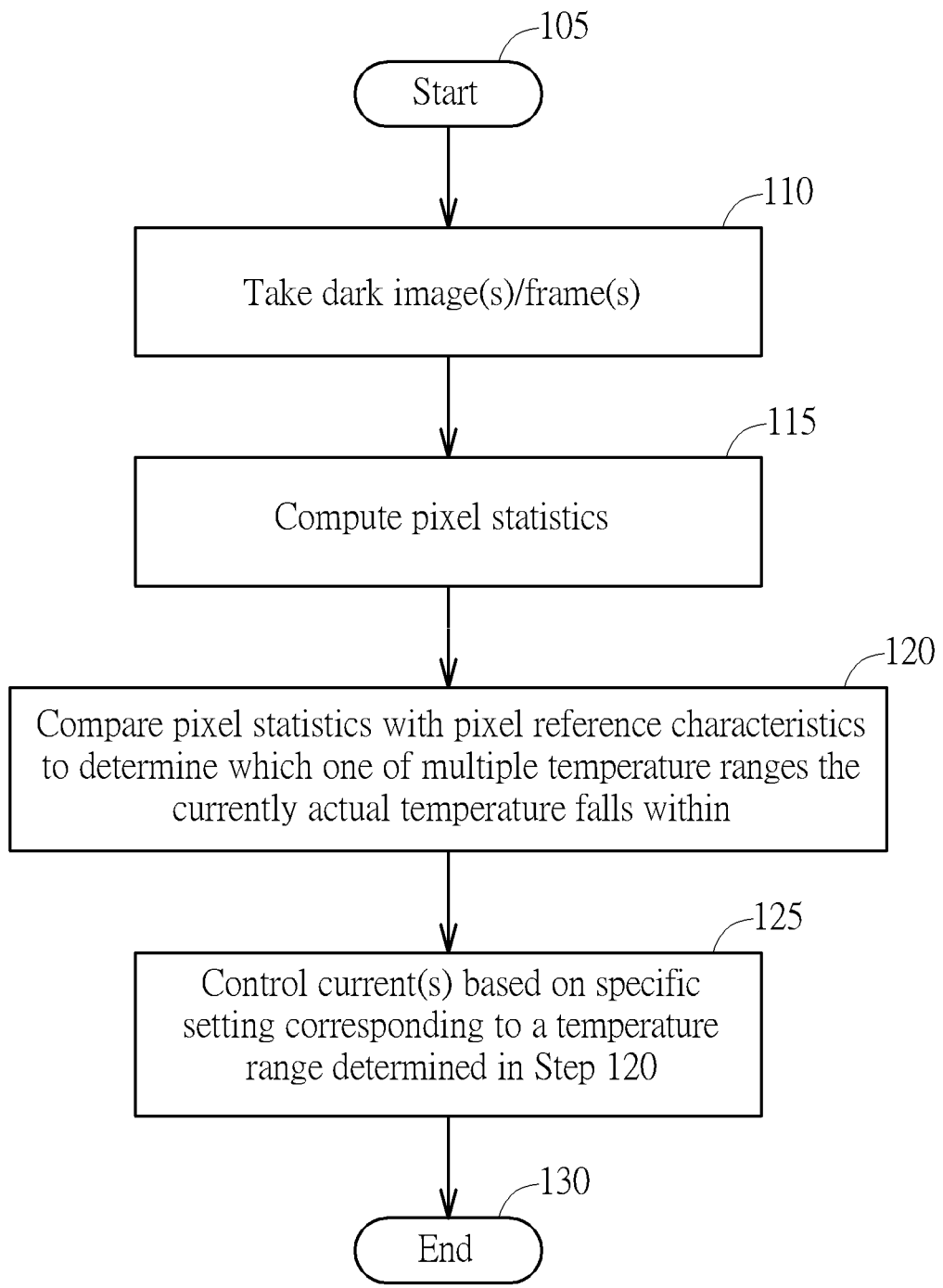
FIG. 1 is a flowchart diagram of the method/process applied to an image sensor device according to an embodiment of the invention.
Figure 2:
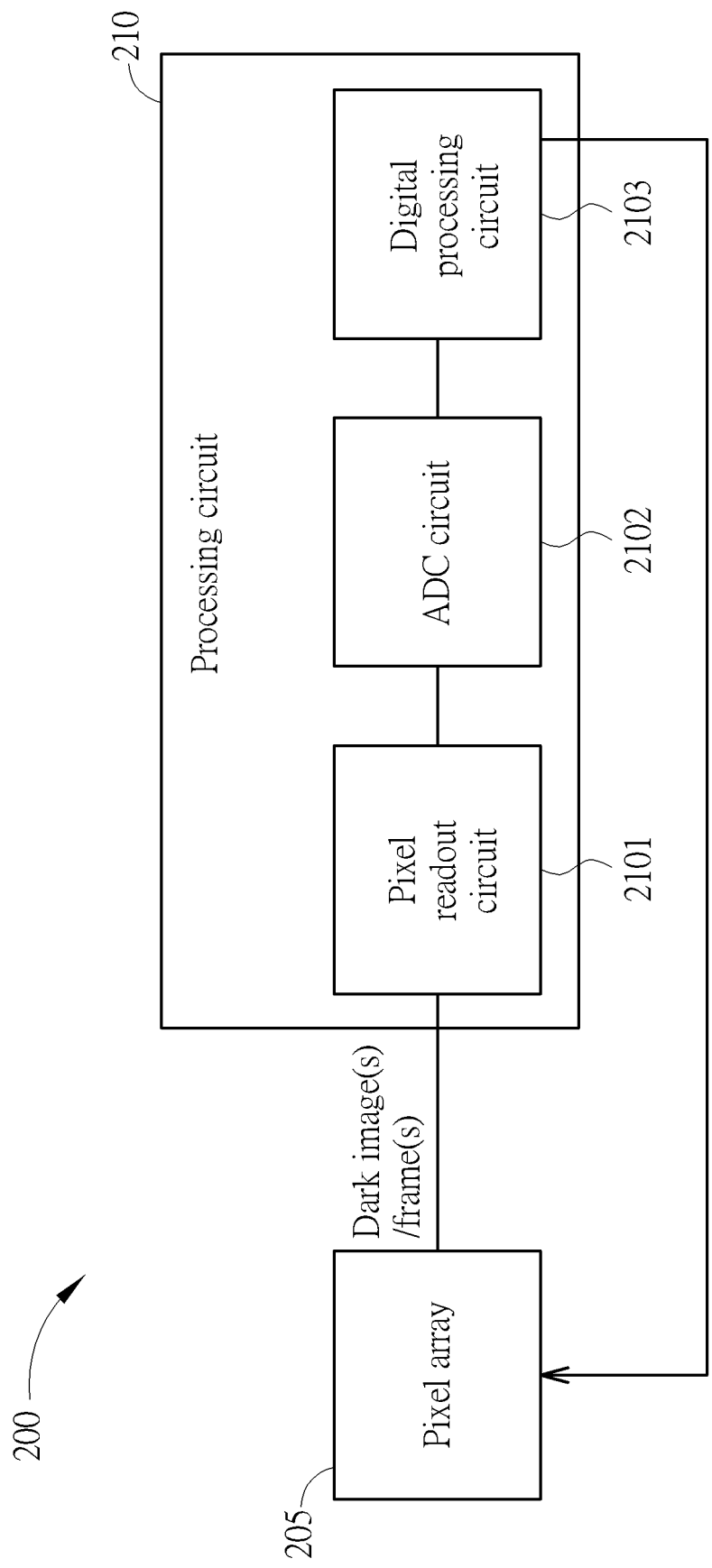
FIG. 2 is a block diagram of an image sensor device according to the embodiment of FIG. 1.

Refer to FIG. 1 in conjunction with FIG. 2. FIG. 1 is a flowchart diagram of the method/process applied to an image sensor device according to an embodiment of the invention. FIG. 2 is a block diagram of the image sensor device 200 according to the embodiment of FIG. 1. The image sensor device 200 comprises a pixel array 205 and a processing circuit 210 which comprises a pixel readout circuit 2101, an analog-to-digital converter (ADC) circuit 2102, and a digital processing circuit 2103. The pixel array 205 and pixel readout circuit 2201 are formed as an analog front-end circuit. Provided that substantially the same result is achieved, the steps of the flowchart shown in FIG. 1 need not be in the exact order shown and need not be contiguous, that is, other steps can be intermediate. Steps are detailed in the following:

Step 105: Start;

Step 110: Take/Capture dark image(s)/frame(s) with a predetermined shutter time;

Step 115: Compute a pixel statistic according to the dark image(s)/frame(s);

Step 120: Compare the pixel statistic with at least one pixel reference characteristics to determine which one of multiple temperature ranges the currently actual temperature falls within or to classify the currently actual temperature into one of the multiple temperature ranges, to generate a comparison result; the multiple temperature ranges have at least two different ranges (but not limited);

Step 125: Control and/or adjust at least one specific current associated with the image sensor device based on a specific setting corresponding to a temperature range determined by the comparison result of Step 120: and Step 130: End.

The pixel array 205 comprises multiple sensing pixel units arranged in N rows and M columns; N and M are integers which may be identical or different. The sensing pixel units may be implemented by using 3T (three transistors) pixel structure, 4T (four transistors) pixel structure, or BJT pixel structure; this is not intended to be a limitation.

The pixel array 205 is arranged to employ the sensing pixels to sense and generate analog voltage(s) so as to sense and generate image(s) or frame(s). The analog voltage(s) is/are read out by the pixel readout circuit 2101 and then converted into digital value(s) or code(s) by the ADC circuit 2102. Then, the digital processing circuit 2103 performs various calculations based on the digital value(s) or code(s) and may control the pixel array 205 based on the results of calculations.

In practice, the processing circuit 210 can employ the digital processing circuit 2103 to control an exposed time of sensing pixel unit(s) of the pixel array 205. In detailed, if the pixel array 205 is arranged to sense incident light reflected and emitted from a light emitting circuit such as a light emitting diode (LED), the digital processing circuit 2103 can be arranged to control emission of the LED and a corresponding LED current. In addition, the digital processing circuit 2103 can control a time length of shutter time period (i.e. exposed time) required by the pixel array 205.

In Step 110, to take/capture dark image(s)/frame(s), the digital processing circuit 2103 controls to turn on the shutter of pixel array 205 with a predetermined shutter time, and disables the LED. When the LED is being disabled and the shutter is being turned on with the predetermined shutter time, the processing circuit 210 uses and controls the pixel array 205 to sense and generate dark image(s)/frame(s).

In Step 115, the digital processing circuit 2103 is arranged to compute a pixel statistic value as the pixel statistic according to the dark image(s)/frame(s). In practice, when the dark image(s)/frame(s) is/are sensed and generated by the pixel array 205, the pixel readout circuit 2101 is arranged to read out corresponding analog pixel voltage(s) of the dark image(s)/frame(s). The ADC circuit 2102 is arranged to convert the corresponding analog pixel voltage(s) into digital value(s) or digital code(s). The digital processing circuit 2103 receives the digital value(s) or digital code(s) of the dark image(s)/frame(s) and computes the pixel statistic value based on the digital value(s) or digital code(s).

In practice, for example, the digital processing circuit 2103 is arranged to compute an average value of pixels (i.e. digital pixels values of the dark image(s)/frame(s)) sensed by pixel array 205 to generate the pixel statistic value; that is, such average value is used as the pixel statistic value. Alternatively, in another embodiment, the digital processing circuit 2103 may be arranged to compute a minimum value of the digital pixels values of the dark image(s)/frame(s) and a maximum value of the digital pixels values and then to derive a difference between the minimum value and maximum value to generate the pixel statistic value; that is, such difference is used as the pixel statistic value. The above modifications are not meant to be limitations. In other embodiments, the digital processing circuit 2103 may perform various algorithms for different calculations to generate the pixel statistic value.

After the pixel statistics is generated, in Step 120, the digital processing circuit 2103 of processing circuit 210 is arranged to compare the pixel statistics with the pixel reference characteristics. Specifically, the digital processing circuit 2103 is used to compare the pixel statistic value with one or more pixel reference values to decide which one of the pixel reference values is near to the pixel statistic value. Each pixel reference value corresponds to a corresponding temperature range. If determining that the pixel statistic value is closer or more adjacent to a particular pixel reference value, the digital processing circuit 2103 can decide that the value of currently actual temperature is within a particular temperature range associated with such particular pixel reference value. In other words, if the digital processing circuit 2103 identifies that the pixel statistic value becomes different and closer to another pixel reference value, the digital processing circuit 2103 can decide that the characteristics of generated dark image(s)/frame(s) becomes different due to the significant change of temperature. Thus, by doing so, without actually detecting to obtain the value of currently actual temperature, the processing circuit 210 can accurately decide or detect which one of the temperature ranges the value of currently actual temperature falls within.

In the embodiment, the currently actual temperature mentioned above indicates a working/operating environment temperature of the image sensor device 200 (but not limited). In other words, the digital processing circuit 2103 can classify the value of working/operating environment temperature into a particular one of the multiple temperature ranges according to the comparison result of the pixel statistic value with the pixel reference values. The pixel reference value(s) for example is/are digital reference value(s) which can be generated by testing the image sensor device 200 with different operating temperature ranges when the image sensor device 200 is manufactured. The generating operation can be performed by the processing circuit 210 and/or an external testing equipment device. It should be noted that the operation of computing the pixel statistic value is partially similar to that of generating the pixel reference value. For example, if the operation of computing the pixel statistic value adopts an average value of the pixels as the pixel statistic value, the operation of generating the pixel reference value also adopts a corresponding average value of pixel values under test as the pixel reference value. If the operation of computing the pixel statistic value adopts a difference between minimum and maximum values of the pixels as the pixel statistic value, the operation of generating the pixel reference value also adopts a corresponding difference between minimum and maximum values of pixel values under test as the pixel reference value. However, this is not intended to be a limitation. The algorithms for calculations of pixel statistic value and pixel reference value may be different.

In Step 125, after the particular temperature range is determined from the multiple temperature ranges by comparing the pixel statistic value with pixel reference values, the digital processing circuit 2103 is arranged to adopt a specific setting/configuration among multiple settings/configurations to adjust and/or control at least one current associated with the image sensor device 200 wherein the specific setting/configuration is associated with such particular temperature range.

The at least one current associated with the image sensor device 200 may comprise a biasing current provided for the pixel array 205, a biasing current provided for a transamplifier and the ADC circuit 2102, and/or a current provided for the light emitting circuit, i.e. LED current; this is not meant to be a limitation. By doing so, the image sensor device 200 can dynamically adjust and control the above-mentioned current(s) based on the temperature range which the value of working/operating environment temperature is at, to avoid signal/image noise due to significant temperature change(s) as well as to save more circuit costs.

Figure 3:
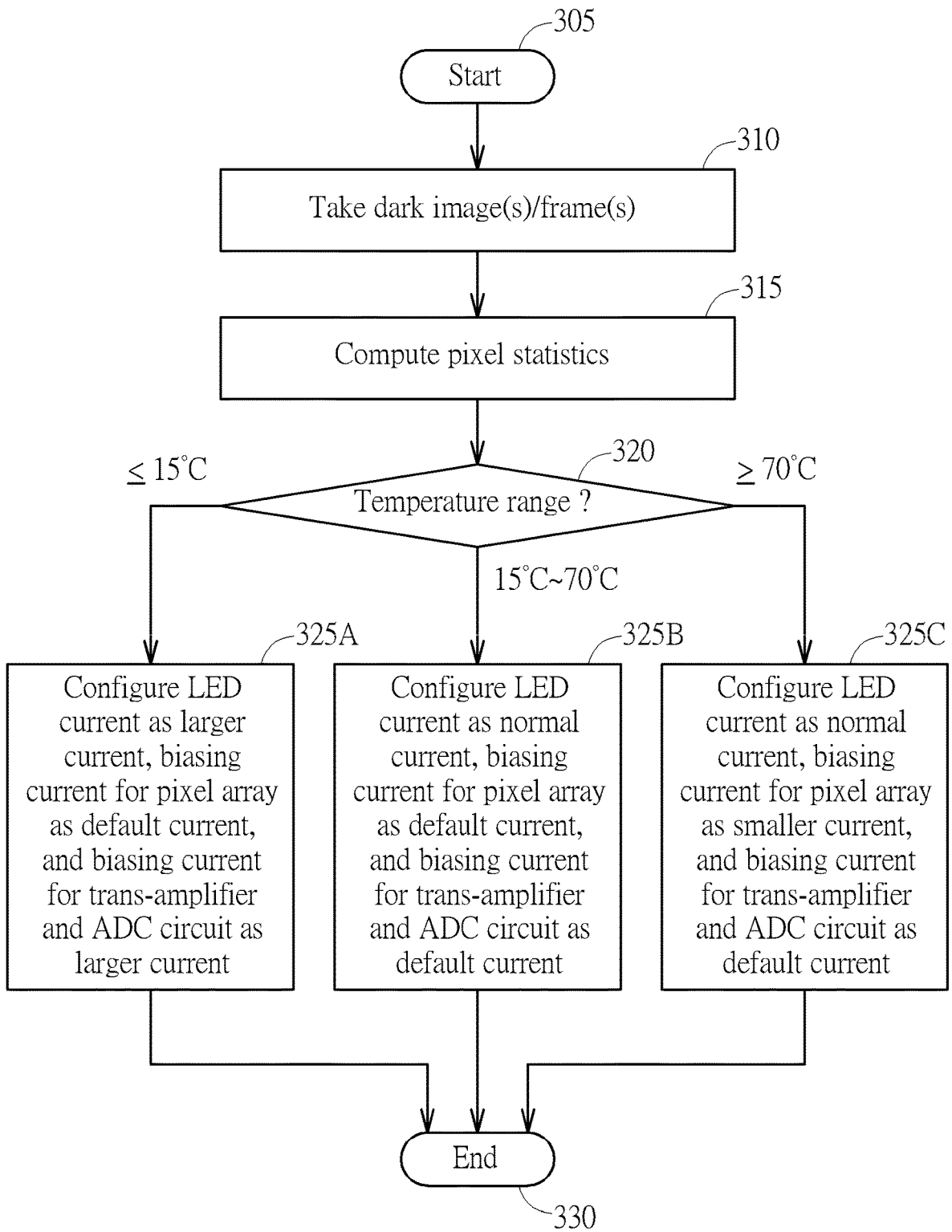
FIG. 3 is a flowchart diagram of another method/process applied to the image sensor device of FIG. 2 according to other embodiments of the invention.

In another embodiment, the image sensor device 200 is suitable for the wider temperature range such as a range from −40 degrees Celsius (° C.) to 125° C. (but not limited). Refer to FIG. 3. FIG. 3 is a flowchart diagram of the method/process applied to the image sensor device 200 according to other embodiments of the invention. Provided that substantially the same result is achieved, the steps of the flowchart shown in FIG. 3 need not be in the exact order shown and need not be contiguous, that is, other steps can be intermediate. Steps are detailed in the following:

Step 305: Start;

Step 310: Take/Capture dark image(s)/frame(s) with a predetermined shutter time;

Step 315: Compute a pixel statistic according to the dark image(s)/frame(s);

Step 320: Compare the pixel statistic with at least one pixel reference characteristics to determine which one of three temperature ranges the value of currently actual temperature falls within; the three temperature ranges have a normal temperature range, a high temperature range, and a low temperature range (but not limited); if the high temperature range is determined, the flow proceeds to Step 325A; if the normal temperature range is determined, the flow proceeds to Step 325B; if the low temperature range is determined, the flow proceeds to Step 325C;

Step 325A: The digital processing circuit 2103 controls or configures the LED current as a larger current such as 35 mA (i.e. large current setting), controls the biasing current provided for the pixel array 205 as a default biasing current (i.e. default current setting), and controls or configures the biasing current provided for the trans-amplifier and ADC circuit 2102 as a larger current (i.e. large current setting);

Step 325B: The digital processing circuit 2103 controls or configures the LED current as a normal current such as 8 mA (i.e. normal/default current setting), controls the biasing current provided for the pixel array 205 as a default biasing current (i.e. normal/default current setting), and controls or configures the biasing current provided for the trans-amplifier and ADC circuit 2102 as a default biasing current (i.e. normal/default current setting);

Step 325C: The digital processing circuit 2103 controls or configures the LED current as the normal current such as 8 mA (normal/default current setting), controls the biasing current provided for the pixel array 205 as a smaller biasing current (i.e. small current setting), and controls or configures the biasing current provided for the trans-amplifier and ADC circuit 2102 as a default biasing current (i.e. normal/default current setting); and Step 330: End.

For example, the image sensor device 200 is suitable for the wider temperature range may be from −40 degrees Celsius (° C.) to 125° C. (but not limited), and the image sensor device 200 may divide such wider range into three different ranges such as the high temperature range, normal range, and low temperature range. For instance, the high temperature range, normal range, and low temperature range may be respectively defined by a range higher than 70° C., a range from 15° C. to 70° C., and a range lower than 15° C. However, this is not intended to be a limitation.

To generate three pixel reference values respectively corresponding to the three temperature ranges, the three pixel reference values can be generated by testing the image sensor device 200 with the high temperature range, normal range, and low temperature range sequentially when the image sensor device 200 is manufactured. The generating operation can be performed by the processing circuit 210 and/or an external testing equipment device.

For example, the external testing equipment device may disable the LED and turn on the shutter of pixel array 205 with the predetermined time period or multiple periods, and then test sensing pixel characteristics of pixel array 205 under the three different operating temperature ranges or with different operating temperatures. For example, the image sensor device 200 may be sequentially tested with three different temperatures respectively within the above-mentioned different ranges (≤15° C., 15° C.~70° C., and ≥70° C.), to generate and obtain three sets of sensing pixel voltages of dark image(s)/frame(s) in analog domain. The ADC circuit 2102 is arranged to convert the three sets of sensing pixel voltages of dark image(s)/frame(s) in analog domain into three sets of digital values/codes respectively. The three sets of digital values can be used by the digital processing circuit 2103 to compute three different pixel values corresponding to different temperature ranges. The three different pixel values corresponding to different temperature ranges are used by the digital processing circuit 2103 as three pixel reference values.

When the image sensor device 200 is being operated by a user and the value of working/operating environment temperature does not vary out of a temperature range, a pixel statistic value currently computed (i.e. real time pixel statistic value) corresponds to or is close to a pixel reference value associated with such temperature range. Once the processing circuit 210 detects that the pixel statistic value currently computed becomes close to a different pixel reference value associated with a different temperature range, the processing circuit 210 can determine that the value of working/operating environment temperature has varied and is now at such different temperature range. That is, by comparing a pixel statistic value with pixel reference value(s), the image sensor device 200 can successfully detect that the value of working/operating environment temperature has significantly varied from a range to a different range. The whole detection is not involved with a temperature sensor circuit. That is, the temperature sensor circuit is not necessary or required. The circuit costs can be reduced.

After detecting the current temperature range which the value of actually operating/working environment temperature falls within, the processing circuit 210 is arranged to control and/or adjust at least one of the biasing current provided for the pixel array 205, the biasing current provided for the trans-amplifier and the ADC circuit 2102, and the LED current.

For example, if the digital processing circuit 2103 determines or identifies that the actually operating/working environment temperature is at the normal temperature range (e.g. 15° C.~70° C.), the digital processing circuit 2103 in Step 325B is arranged to configure the LED current as the normal current such as 8 mA based on a normal/default current setting of LED current, to configure the biasing current provided for the pixel array 205 as a default biasing current based on a normal/default current setting of such biasing current, and to configure the biasing current provided for the trans-amplifier and ADC circuit 2102 as a default biasing current based on a normal/default current setting of such biasing current (in Step 325B). That is, when determining that the image sensor device 200 is being operated under the normal temperature range, the digital processing circuit 2103 is arranged to control the above-mentioned currents based on the normal/default current settings. That is, in this situation, the digital processing circuit 2103 is arranged to maintain the above-mentioned currents and/or maintain the normal/default current settings when the value of actually operating/working environment temperature is classified into the normal temperature range.

Alternatively, when the value of actually operating/working environment temperature significant varies and becomes higher than 70° C. (i.e. at the high temperature range), the digital processing circuit 2103 can detect that the pixel statistic value currently computed becomes close to the pixel reference value associated with the high temperature range and then can determine that the value of actually operating/working environment temperature has been at the high temperature range. The digital processing circuit 2103 is arranged to configure at least one of the above-mentioned currents based on different setting(s). For example, the digital processing circuit 2103 may configure the LED current as a larger current such as 35 mA based on a large current setting of LED current, configure the biasing current provided for the pixel array 205 as the default biasing current based on the normal/default current setting of such biasing current, and configure the biasing current provided for the trans-amplifier and ADC circuit 2102 as a larger current based on a large current setting of such biasing current (in Step 325A). That is, when deciding that the value of actually operating/working environment temperature shifts form the normal temperature range to the high temperature range, the digital processing circuit 2103 is arranged to increase the LED current from a normal current value to a larger current value, to increase the biasing current for the trans-amplifier and ADC circuit 2102 from a normal current value to a larger current value, and to maintain or keep the biasing current for the pixel array 205 at a normal/default biasing current.

Alternatively, when the value of actually operating/working environment temperature significant varies and becomes lower than 15° C. (i.e. at the low temperature range), the digital processing circuit 2103 can detect that the pixel statistic value currently computed becomes close to the pixel reference value associated with the low temperature range and then can determine that the value of actually operating/working environment temperature has been at the low temperature range. The digital processing circuit 2103 is arranged to configure at least one of the above-mentioned currents based on different current setting(s). For example, the digital processing circuit 2103 may configure the LED current as a normal current such as 8 mA based on the normal/default current setting of LED current, configure the biasing current provided for the pixel array 205 as a smaller biasing current based on the small current setting of such biasing current, and configure the biasing current provided for the trans-amplifier and ADC circuit 2102 as a default current based on the normal/default current setting of such biasing current (in Step 325C). That is, in this situation, the digital processing circuit 2103 is arranged to maintain or keep the LED current based on the normal/default current setting of LED current, to reduce or decrease the biasing current provided for the pixel array 205 based on the small current setting of such biasing current, and to maintain or keep the biasing current provided for the trans-amplifier and ADC circuit 2102 as a default current based on the normal/default current setting of such biasing current.

By doing so, the image sensor device 200 is capable of optimizing its performance by dynamically adjust LED current and/or biasing current(s) of other circuits based on appropriate settings corresponding to different temperature ranges, so as to avoid image/signal noises and to save circuit costs. Compared to the conventional image sensor, the image sensor device 200 is more suitable for a wider temperature range such as from −40° C. to 125° C.

Also, the image sensor device 200 is capable of determining the optimum LED current based on the optimum LED current setting corresponding to the determined temperature range to improve tracking performance if the image sensor device 200 is applied into an optical navigation device. In addition, in some examples, the LED current setting can be controlled or adjusted by using a digital-to-analog conversion (DAC) circuit to control the resistance connected in series with the LED to set/configure different LED current levels. In addition, based on the information of dark image(s)/frame(s), the biasing current(s) of power hungry analog blocks such as the trans-amplifier, ADC circuit 2102, and pixel biasing can be finely tuned to achieve more optimum power consumption level. Further, the above-mentioned shutter time period can be also as a reference to be used with the information of dark image(s)/frame(s) to determine or infer the value of actually operating/working environment temperature of image sensor device 200. This detection, different from the operation of a conventional temperature sensor, can be equivalently regarded as a crude temperature sensing operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of an image sensor device, comprising:
   using a pixel array of the image sensor device to sense and generate at least one dark frame; and
   determining which one of a plurality of temperature ranges a temperature of the image sensor device falls within according to pixel statistics of the at least one dark frame;
   wherein the at least one dark frame is sensed and generated when a light emitting circuit associated with the image sensor device is being disabled and a shutter of the image sensor device is turned on with a predetermined shutter time.

2. The method of claim 1, wherein the temperature of the image sensor device is an operating environment temperature of the image sensor device.

3. The method of claim 1, wherein the determining step comprises:
   comparing the pixel statistics with pixel reference characteristics to generate a comparison result; and
   classifying the temperature of the image sensor device into one of the plurality of temperature ranges according to the comparison result.

4. The method of claim 3, wherein the pixel reference characteristics is generated by testing the image sensor device with different operating temperature ranges when the image sensor device is manufactured.

5. The method of claim 1, further comprising:
   computing an average value of pixels sensed by the pixel array according to the at least one dark frame to use the average as the pixel statistics.

6. The method of claim 1, further comprising:
   computing a minimum value and a maximum value of pixels sensed by the pixel array according to the at least one dark frame; and deriving a difference between the minimum value and the maximum value to use the difference as the pixel statistics.

7. The method of claim 1, further comprising:
increasing a current of a light emitting circuit associated with the image sensor device from a normal current value to a higher current value when the temperature of the image sensor device is classified into a high temperate range; and
maintaining the current of the light emitting circuit at the normal current value when the temperature of the image sensor device is classified into a normal temperate range or a low temperature range.

8. The method of claim 7, further comprising:
reducing/decreasing a biasing current provided for the pixel array or a biasing current provided for a trans-amplifier and an analog-to-digital circuit when the temperature of the image sensor device is classified into the low temperature range;
maintaining the biasing current provided for the pixel array or the biasing current provided for the trans-amplifier and the analog-to-digital circuit when the temperature of the image sensor device is classified into the normal temperature range; and
maintaining the biasing current provided for the pixel array and increasing the biasing current provided for the trans-amplifier and the analog-to-digital circuit when the temperature of the image sensor device is classified into the high temperature range.

9. An image sensor device, comprising:
a pixel array, configured to sense and generate at least one dark frame;
a processing circuit, coupled to the pixel array, configured for determining which one of a plurality of temperature ranges a temperature of the image sensor device falls within according to pixel statistics of the at least one dark frame;
wherein the at least one dark frame is sensed and generated when a light emitting circuit associated with the image sensor device is being disabled and a shutter of the image sensor device is turned on with a predetermined shutter time.

10. The image sensor device of claim 9, wherein the temperature of the image sensor device is an operating environment temperature of the image sensor device.

11. The image sensor device of claim 9, wherein the processing circuit is arranged for:
comparing the pixel statistics with pixel reference characteristics to generate a comparison result; and
classifying the temperature of the image sensor device into one of the plurality of temperature ranges according to the comparison result.

12. The image sensor device of claim 11, wherein the pixel reference characteristics is generated by testing the image sensor device with different operating temperature ranges when the image sensor device is manufactured.

13. The image sensor device of claim 9, wherein the processing circuit is arranged for computing an average value of pixels sensed by the pixel array according to the at least one dark frame to use the average value as the pixel statistics.

14. The image sensor device of claim 9, wherein the processing circuit is arranged for:
computing a minimum value and a maximum value of pixels sensed by the pixel array according to the at least one dark frame; and
deriving a difference between the minimum value and the maximum value to use the difference as the pixel statistics.

15. The image sensor device of claim 9, wherein the processing circuit is arranged for controlling a light emitting circuit associated with the image sensor device to increase a current of the light emitting circuit from a normal current value to a higher current value when the temperature of the image sensor device is classified into a high temperate range; and, the processing circuit is arranged for controlling the light emitting circuit to maintain the current of the light emitting circuit at the normal current value when the temperature of the image sensor device is classified into a normal temperate range or a low temperature range.

16. The image sensor device of claim 15, wherein the processing circuit is arranged for:
reducing/decreasing a biasing current provided for the pixel array or a biasing current provided for a trans-amplifier and an analog-to-digital circuit when the temperature of the image sensor device is classified into the low temperature range;
maintaining the biasing current provided for the pixel array or the biasing current provided for the trans-amplifier and the analog-to-digital circuit when the temperature of the image sensor device is classified into the normal temperature range; and
maintaining the biasing current provided for the pixel array and increasing the biasing current provided for the trans-amplifier and the analog-to-digital circuit when the temperature of the image sensor device is classified into the high temperature range.

* * * * *